United States Patent

Nilsson

[15] 3,701,940

[45] Oct. 31, 1972

[54] SYSTEM FOR DETERMINING ELECTRIC GEOPHYSICAL PROSPECTING WORK USING SYNCHRONIZED CLOCKS AND DIRECT COUPLED COMPARISON MEANS

[72] Inventor: Bruno Yngve Nilsson, Boliden, Sweden

[73] Assignee: Boliden Aktiebolag, Stockholm, Sweden

[22] Filed: Dec. 28, 1970

[21] Appl. No.: 102,020

[30] Foreign Application Priority Data

Jan. 5, 1970 Sweden ............... 81/1970

[52] U.S. Cl. .................................. 324/1, 324/9
[51] Int. Cl. ..................................... G01v 3/06
[58] Field of Search ........................ 324/1, 6, 9, 57

[56] References Cited

UNITED STATES PATENTS

| 3,113,265 | 12/1963 | Woods et al. | 324/1 |
| 2,977,417 | 3/1961 | Doelz et al. | 178/51 |
| 2,390,270 | 12/1945 | Piety | 324/1 |
| 2,343,140 | 2/1944 | Evjen | 324/1 |
| 2,375,775 | 5/1945 | Evjen | 324/1 |
| 3,473,113 | 10/1969 | Schluter | 324/57 R |
| 3,414,809 | 12/1968 | Hoffmann et al. | 324/57 R |

Primary Examiner—Gerard R. Strecker
Attorney—Stevens, Davis, Miller & Mosher

[57] ABSTRACT

A system for determining in geophysical prospecting work the complex electric field generated by an AC current charged to the ground, wherein the synchronization of the AC current charged to the ground and a compensation measuring means is provided by at least one precision clock, e.g., quartz-oscillator, and wherein the measuring means is direct-coupled and provided with means compensating for and balancing the DC current occurring in the measured signal. The measuring means is further provided with means compensating for the part of the measured signal being in phase with said AC current and means compensating for the part of the measured signal being 90° out of phase from said AC current.

2 Claims, 2 Drawing Figures

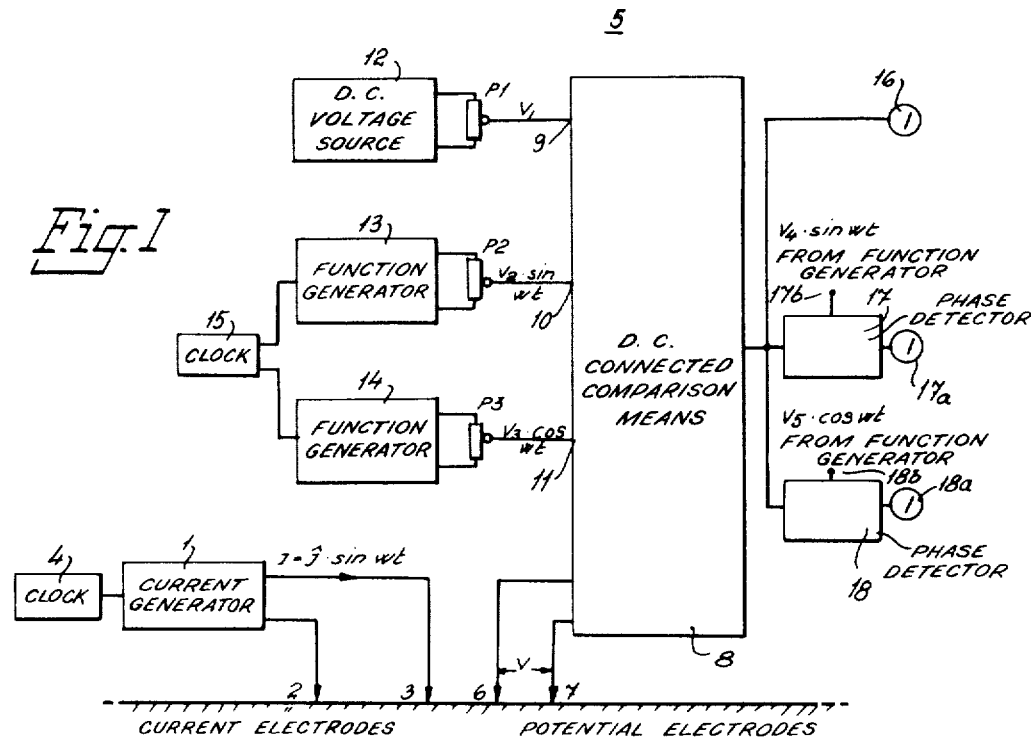
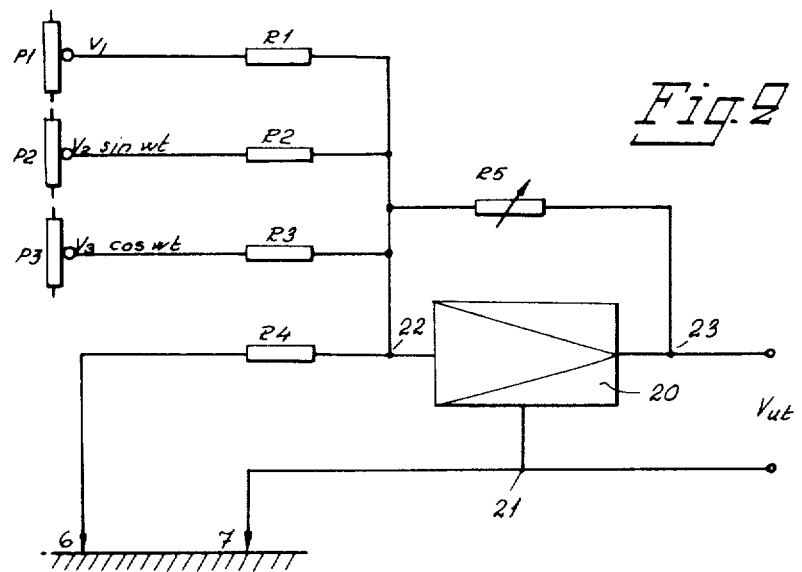

SYSTEM FOR DETERMINING ELECTRIC GEOPHYSICAL PROSPECTING WORK USING SYNCHRONIZED CLOCKS AND DIRECT COUPLED COMPARISON MEANS

The present invention relates to a system for determining in geophysical prospecting work the complex electric fields generated by an AC current charged from a current source to the ground via two or more electrodes, the voltage differences in the complex electric field being determined with respect to phase and amplitude by means of a measuring apparatus which is provided with a compensation voltage generating device and a comparison device adapted to compare the compensation voltage with the voltage difference prevailing between at least two additional electrodes placed in the ground.

It has long been known within the field of geophysics to utilize electrical methods for geophysical prospecting purposes and a number of methods have been developed in which complex electric fields are determined at low frequencies (0.01 - 10 Hz). These methods are normally grouped under the general heading "methods for induced polarization," or in abbreviated form IP-methods.

These methods are based on the fact that if an electric field is applied to the bedrock through electrodes inserted in the ground, electrical charges and discharges occur within the bedrock, and especially at the interface between the valuable minerals and the worthless constituents of a solid crude or ore, which cause disturbances in the normal electric field. If an electrical field which varies with time, for example an alternating field from an alternating current generator, is applied, the so-called IP-effects cause the characteristics of the AC voltage between two points in the vicinity of a disturbing body, e.g., an ore body, to differ from what they would have been if the disturbing body had not been present. Thus, the voltage may be changed both with respect to amplitude and phase position.

In practice the electric field is produced by feeding an electric current from a current source into the bedrock through two electrodes inserted in the ground or through a system of electrodes, which may comprise a large number of electrodes. Occasionally, two or more so-called line electrodes are used, which can be considered to form an electrode system having an infinite number of point electrodes.

In practice, the generated electric field is normally studied by measuring the voltage differences between potential electrodes placed at two locations on the surface of the ground. The voltage differences between pairs of points lying along one or more profiles are generally determined systematically. If the pairs of points are also measured together with points on different profiles, a total image of the electric field in the plane of the ground can be obtained. If drill holes are located within the area being measured, it is also possible to obtain a three-dimensional image of the electric field by measuring voltage differences between pairs of points of which one point lies in the plane of the ground and the other is located in a drill hole. It is also possible to measure voltage differences between pairs of points lying in the same or different drill holes. In the last mentioned case, the electrodes must naturally be located in the drill hole by means of special devices.

When practicing IP-methods, several difficulties are met with which, although different methods have been devised to overcome them, have not completely been removed.

If two electrodes are buried in the surface of the ground at two points in a certain spaced apart relationship, a voltage difference often exists between the electrodes. There are several reasons for the presence of this voltage difference. A relatively constant voltage difference, called natural potential or SP, may be caused by galvanic currents in the environment of the composed ore bodies or also by concentration differences in electrolyte in the surface of the ground. Other reasons for the occurrence of the voltage difference include telluric currents, TP, of more regional extent, and artificial earth currents, AP, from power station networks, railway networks and trolley car networks and the like. These last mentioned interferences cause greater or smaller periodic alternating voltages or transients which are superimposed on the voltage differences from the electric field to be studied and therefore constitute more serious interference problems than interferences from the more constant, natural potential SP. In order to reduce the influence of the aforementioned interference sources, attempts have aforementioned made to increase the field strength of the electric field applied to the bedrock, although this possibility is relatively restricted since it is necessary in this respect to increase the voltage between the current electrodes to such an extent that the measuring apparatus becomes dangerous to handle.

The different IP methods have, in principal, been divided into two groups, i.e., the so-called pulse methods and the AC current methods.

The pulse methods normally employ a commutated DC current which is regulated so that the incoming current is switched on for a first specific period of time. The current is then interrupted for a certain period of time, and then switched on with reverse poling or a period of time equal to the first mentioned time period, whereafter the current is again interrupted. This sequence is repeated regularly. With this type of method, the I.P. effect, i.e., the information which is later made the basis of the geophysical evaluation, is determined by measuring the voltage difference decay between the measuring electrodes as a function of the time. Thus, the voltage differences $\Delta V$ occurring between the potential electrodes, the measuring electrodes, at certain time periods $t_1, t_2, t_3 \ldots$ after the current has been interrupted is measured. The mean voltage is thus measured technically within relatively short time periods $(t_1, t_1 + \Delta t), (t_2, t_2 + \Delta t)$ etc. Superimposed interferences of the TP- and AP-type can thus deleteriously influence the measuring results, particularly if they occur within the selected time intervals. One method of reducing disturbances from transients and disturbances of this type is to select longer time intervals $(t_1, t_1 + \Delta t)$, i.e., a greater $\Delta t$, and to measure the mean voltage as volt seconds/second, i.e., the integral:

$$\frac{1}{\Delta t} \int_{t_1}^{t_1 + \Delta t} \Delta V dt$$

In this case, the different time positions are naturally less well defined. Owing to the interferences, it is extremely difficult to determine accurately the decay curve of the voltage difference, which in turn renders the subsequent geophysical evaluation unreliable.

When applying the AC current IP method, an AC current is fed to the ground through the current electrodes. In this instance, in order to obtain information on the geological situation, it has been elected to determine the phase difference between the input AC current and the alternating voltage measured between the potential electrodes, the method being performed in a manner whereby a voltage proportional to the primary current and a voltage proportional to the voltage difference between the potential electrodes are each connected to its respective pair of plates in an oscilloscope. The phase angle is then determined from the Lissajou-image formed on the screen of the oscilloscope. In this case, the measuring system must be relatively broad-banded, which causes the system to be highly sensitive to TP and AP interference. When determining phase angles by means of Lissajou-images, the measuring result is always highly suspect and a further disadvantage with this measuring method is that the apparatus used is rather cumbersome for field use.

With other known measuring process using AC current IP methods the voltage sensed from the potential electrodes is amplified, the amplitude for different frequencies being mutually compared. The influence of both periodic and aperiodic TP and AP-interference is also significant in this method.

In order to obtain better information on the electric field when making geophysical measurements, it has earlier been proposed to utilize AC current compensation, the phase and amplitude of the measured voltage being determined in relation to the input AC current. Consequently, with the known apparatus a wire connection is arranged between the current source and the measuring apparatus for the purpose of transmitting the synchronizing signal required for the compensation measurement. These wire connections, however, are clumsy and impractical for use in the open country and, moreover, constitute an interference source in the system. A further disadvantage is that the measuring means and current source of the known apparatus must lie on the same DC voltage potential or be provided with DC voltage insulating means which can have a deleterious effect on the syncronization, particularly if measurements are to be taken at different frequencies.

The object of the present invention is therefore to provide a system of the type mentioned in the introduction which substantially eliminates the aforementioned disadvantages.

The system of the present invention is mainly characterized in that for the purpose of synchronizing the compensating voltage generating means with the input alternating current there is arranged in the measuring apparatus a precision clock, e.g., a quartz oscillator, which has been pre-synchronized with the AC current fed from the current source in a manner whereby said precision clock operates with a known phase difference, preferably °in relation to said AC current.

The voltage existing between the two additional electrodes normally contains a DC component and in order to diminish interference and transient problems during the compensation measurement the compensation voltage generating apparatus of the system of the invention may be constructed to generate a variable AC voltage having the same phase position as the input AC current and a variable AC voltage which is in 90° phase shift relative to the input AC current, these voltages having the same frequency as said AC current, wherein the compensating voltage generating apparatus is also arranged to generate a variable compensating DC voltage and the comparison apparatus is DC voltage connected.

The measuring apparatus is preferably also provided with an indicating means which includes a means which is only responsive to and will only indicate an error signal in phase with the input AC current, a further means which is only responsive to and will only indicate an error signal 90° out of phase with the input AC current, and a means which indicates the DC voltage component of the error signal.

The invention will now be described in more detail with reference to an embodiment thereof illustrated in the accompanying drawing, in which:

FIG. 1 is a block diagram diagrammatically showing a measuring system constructed in accordance with the invention, and FIG. 2 is a wiring diagram of an embodiment of the DC connected comparison means depicted in FIG. 1.

FIG. 1 illustrates a system for determining complex electric fields in geophysical prospecting operations. An AC current I of known magnitude is supplied to the system by means of a current generator 1 over two electrodes or an electrode system 2, 3 located in the ground. The frequency of the AC current can be selected within a relatively wide frequency region, although a suitable value is normally approximately 1 Hz. For more reliable interpretation of existing geological problems, it may be convenient in certain instances to make repeated measurements at different frequencies. The current generator 1 is controlled by a first reference clock 4.

A measuring apparatus, generally indicated at 5, is connected to two additional electrodes or electrode systems 6, 7, which are also located in the ground. The relative position between the electrodes 2, 3, 6, 7 may be varied according to the conditions prevailing at the site being prospected. Thus, the measuring electrodes 6, 7 may be located, for example between or externally of the energized electrodes 2, 3, and similarly one or more of the electrodes may be located beneath the surface of the ground in drill holes or the like.

The voltage V between the measuring electrodes 6. 7 is supplied to a DC voltage connected, i.e., direct-coupled, comparison apparatus 8. The comparison apparatus 8 has three additional inputs 9, 10, 11. Each of the additional inputs are connected to the movable tap contact of its respective potentiometer P1 P2 and P3 respectively. Connected across the terminals of the potentiometer P1 is a DC voltage source 12, which supplies a pre-determined DC voltage across the potentiometer.

Connected across the terminals of the potentiometers P2 and P3 are two function generators 13 and 14 respectively. The function generators 13, 14 are controlled by a second reference clock 15 in a manner whereby a voltage of the same frequency as the input AC voltage I and in phase therewith is applied across the potentiometer P2, and whereby a voltage of the same frequency as the input AC current I and 90° out of phase therewith is applied across the potentiometer P3. The voltages from the function generators 13, 14 and the DC voltage source 12 have a pre-determined amplitude and magnitude, so that the setting positions of the potentiometers P2, P3 and P1 always correspond to a certain voltage amplitude, for example $V_2$.

The reference clocks 4, 15 are pre-synchronized to the same frequency and phase position. This synchronization must be extremely accurate and the clocks 4, 15 must be extremely stable, since otherwise it may be impossible to obtain the requisite measuring accuracy. Quartz oscillators having a maximum drift of approximately 0.5 millisec./day have been found sufficient in practice.

The necessary reference for the function generators 13, 14 may also be provided in another way, for example by signal transmitting on a radio apparatus. When signal transmitting by radio is used, however, the reference signal is never fully reliable as a result of the varying reception conditions at different locations in the measuring area, and, moreover, it requires expensive and impractical additional equipment.

For the purpose of indicating the output signal from the comparison apparatus, three detectors 16, 17 and 17a, 18 and 18a are arranged. The detector 16 in its simplest form comprises a DC voltage responsive indicating instrument and is adapted to indicate the DC voltage component in the output signal from the comparison apparatus. The detectors 17, 18 comprise phase-sensing detectors and are each provided with an indicating instrument 17a and 18a respectively. The detector 17 is arranged to sense and indicate the component in the output signal from the comparison apparatus 8 which is in phase with the input AC current I. For this purpose, a reference signal from the function generator 13 is connected to a reference input 17b on the phase detector 17. The detector 18 is arranged to sense and indicate the component in the output signal from the comparison apparatus 8 which is 90° out of phase with the input AC current I, and in a similar manner has a reference signal from the function generator 14 connected to a reference input 18b.

FIG. 2 illustrates an example of a wiring diagram for the DC coupled comparison apparatus 8. The reference point 21 of a DC coupled amplifier 20 is connected to one of the measuring electrodes 7. The second measuring electrode 6 is connected, via a series resistance R4, to the input 22 of the amplifier 20. The voltages from the potentiometers P1, P2 and P3 are each connected via their respective series resistance R1, R2 and R3 respectively to the input 22 of the amplifier 20. In the exemplary embodiment, the amplifier 20 is conceived to be of the current responsive type, so that all the signals connected to the input 22 are added. The resistances R1 – R4 can be selected equal but are suitably adjusted according to the relationships between the components incorportated in the voltage V between the measuring electrodes 6 and 7, so that the voltages over the potentiometers P1, P2, P3 are sufficient to compensate the voltage signal V and so that the potentiometer voltage is utilized to the greatest extent possible.

Also connected to the input 22 of the amplifier 20 is a variable feed back resistance R5, the other side of which is connected to the output 23 of the amplifier 20. The amplification factor of the amplifier 20 can be varied by means of the resistance R5. The output signal from the amplifier, $V_{ut}$, is fed parallel to the detectors 16, 17 and 18 illustrated in FIG. 1.

It is extremely important that regard with the speed and accuracy with which the measuring operation is formed that a DC-coupled comparison apparatus is used. Only in this way is it possible to indicate and compensate for the DC voltage constantly occurring between the measuring electrodes 6, 7. If the DC voltages are instead insulated by means of capacitors, transients will occur in the measuring system, impairing the accuracy and speed at which the system can make the measurement.

When measuring the complex field by means of the measuring system of the present invention, the input electrodes 2, 3 are arranged in a suitable manner in the ground around the prospecting site. The measuring electrodes 6, 7 are then placed in the ground, or beneath the surface of the ground in a drill hole for example, at two points between which it is desired to determine the complex voltage. The two reference clocks 4, 15 are pre-synchronized with respect to phase and frequency. When the measuring operation is commenced, a recording will in the majority of cases show on the indicating instruments 16, 17a, 18a through the detectors 16, 17, 18, since the sum current supplied to the input 22 of the amplifier 20 is not zero. The potentiometers P1, P2 and P3 are then adjusted so that the indicating instruments 16, 17a, 18a show zero, i.e., so that the voltage V occurring between the measuring electrodes 6, 7 is compensated. During adjustment of the potentiometers, the amplification factor of the amplifier 20 can be varied by means of the resistance R5 and in the final stages of the adjustment process the amplifier is preferably given a high amplification factor to ensure that the accuracy required in the measuring operation is achieved.

Subsequent to setting the potentiometers, the position of P1 thus represents the magnitude of the DC voltage component in the voltage V and the positions of the potentiometers P2 and P3 represent the voltage component in phase with and the voltage component 90° out of phase with the input AC current I. The AC voltage occurring between the measuring electrodes 6, 7 is determined in this way with respect to amplitude and phase position. The measuring process is then repeated at any desired number of measuring points so that a sufficiently detailed image of the complex electric filed is obtained. This field image is then made the basis of a geophysical evaluation.

The present invention thus enables the complex electric field generated by an AC current charged into the ground to be mapped in a very accurate manner, which is of great importance to the accuracy of the subsequent evaluation and geological interpretation.

The invention is not restricted to the measuring system illustrated in the drawing, but can be modified in a number of ways within the scope of the inventive idea.

Thus, for the purpose of further suppressing interferences and disturbances, a low pass filter can be connected between the measuring electrodes 6, 7 and the amplifier 20. This filter must be so adapted that it gives a constant and known phase shift for the measuring frequencies in question. Furthermore, the indicating instruments 16, 17a, 18a can be replaced with setting motors which actuate the potentiometers P1, P2 and P3 in a manner whereby the compensating process becomes automatic. In accordance with one development of the invention, analogue digital compensation can also be utilized, i.e., potentiometers and associated series resistances can be changed for a group of resistances which are connected under control of the signals behind the detectors. The connected resistance can then be given by means of a numeral indicating means or the like.

What is claimed is:

1. A geophysical prospecting system comprising a portable current generator having at least two electrodes insertable into the ground and arranged to feed an input AC current into the ground via said electrodes to generate a complex electric low frequency field in the ground; a portable measuring means arranged to determine voltage differences with respect to their phase and amplitude in said complex electric field and comprising a compensating voltage generating means, a comparator direct coupled to said compensating voltage generating means, and a first precision clock, and wherein said compensating voltage generating means is arranged to generate a compensating voltage which comprises firstly a variable AC voltage having the same phase position as said input AC current, secondly a variable AC voltage being shifted 90° out of phase in relation to said input AC current, said AC voltages both having the same frequency as said input AC current, and thirdly a variable compensating DC voltage, said comparator being provided with at least two electrodes insertable into the ground, and being arranged to compare said compensating voltage with the voltage difference which owing to the influence of said complex electric field prevails between said last mentioned at least two electrodes when these are inserted in the ground, said first precision clock being pre-synchronized with said input AC current generated by said current generator to operate at a predetermined phase difference thereto, and being arranged to synchronize said compensating voltage generating means with said input AC current; and a second precision clock pre-synchronized with said first precision clock to operate at a predetermined phase difference thereto, and connected to said current generator to control the generation of said input AC current thereby.

2. A system according to claim 1 in which said measuring means is provided with an indicator having a first means responsive to and indicating an error signal in phase with said input AC current, a second means responsive to and indicating an error signal having a 90° phase displacement from said input AC current, and a third means indicating a DC voltage error signal component.

* * * * *

UNITED STATES PATENT OFFICE
CERTIFICATE OF CORRECTION

Patent No. 3,701,940    Dated October 31, 1972

Inventor(s) Bruno Yngve NILSSON

It is certified that error appears in the above-identified patent and that said Letters Patent are hereby corrected as shown below:

The correct title should read:

-- SYSTEM FOR DETERMINING ELECTRIC FIELDS IN

GEOPHYSICAL PROSPECTING WORK USING SYNCHRONIZED CLOCKS

AND DIRECT COUPLED COMPARISON MEANS --

Signed and sealed this 9th day of July 1974.

(SEAL)
Attest:

McCOY M. GIBSON, JR.
Attesting Officer

C. MARSHALL DANN
Commissioner of Patents